(12) United States Patent
Jortikka et al.

(10) Patent No.: US 10,054,192 B2
(45) Date of Patent: Aug. 21, 2018

(54) APPARATUS FOR USE OF CHAIN

(71) Applicant: FINNCHAIN OY, Rauma (FI)

(72) Inventors: Aki-Samuli Jortikka, Rauma (FI); Tomi Aronen, Pori (FI)

(73) Assignee: FINNCHAIN OY, Rauma (FI)

( * ) Notice: Subject to any disclaimer, the term of this patent is extended or adjusted under 35 U.S.C. 154(b) by 242 days.

(21) Appl. No.: 15/111,982

(22) PCT Filed: Jan. 13, 2015

(86) PCT No.: PCT/FI2015/050015
§ 371 (c)(1),
(2) Date: Jul. 15, 2016

(87) PCT Pub. No.: WO2015/121531
PCT Pub. Date: Aug. 20, 2015

(65) Prior Publication Data
US 2016/0341279 A1 Nov. 24, 2016

(30) Foreign Application Priority Data
Feb. 14, 2014 (FI) ...................................... 20145146

(51) Int. Cl.
*F16G 13/07* (2006.01)
*B65G 23/06* (2006.01)

(52) U.S. Cl.
CPC ............. *F16G 13/07* (2013.01); *B65G 23/06* (2013.01)

(58) Field of Classification Search
CPC combination set(s) only.
See application file for complete search history.

(56) References Cited

U.S. PATENT DOCUMENTS

| 3,095,753 A | 7/1963 | Lengyel |
| 5,192,251 A | 3/1993 | Tuomikoski |

(Continued)

FOREIGN PATENT DOCUMENTS

| DE | 102010024865 A1 | 12/2011 |
| FI | 64707 B | 8/1983 |

(Continued)

OTHER PUBLICATIONS

Supplemental European Search Report dated Oct. 6, 2017, in corresponding European Application No. 15748889 (2 pages).

(Continued)

*Primary Examiner* — William E Dondero
*Assistant Examiner* — Robert T Reese
(74) *Attorney, Agent, or Firm* — Venable LLP; Jeffri A. Kaminski

(57) ABSTRACT

An apparatus for use of a chain. The chain is formed of: shaped pieces, to be connected to each other at jointing points in jointing parts, arranged at opposite ends of the shaped pieces, utilizing joint pins. A first jointing point of the jointing parts is arranged as a uniform projection assembly that is narrower than the width of a center part of the shaped piece. A second jointing point as a fork assembly. Each of the jointing points has a hole in order to form a uniform chain by placing the projection assembly of a previous shaped piece between the fork assembly of a following shaped piece and by placing a joint pin in the hole; and a drive arrangement including at least one chain wheel. A supporting surface arranged in the center part of the shaped piece of the chain includes a notch that is arranged crosswise in respect to the moving direction of the chain and that is, during conveying of the chain in cooperation with counterpart surfaces, of the chain wheel and being arranged according to the notches of the chain and crosswise in respect to the (Continued)

moving direction of the chain. A shaped piece of the chain is arranged strengthened by an expansion assembly protruding from a bottom of the notch and continuing uniformly in the longitudinal direction of the shaped piece at the point of the notch. The chain wheel includes counterpart surfaces that settle against the bottom of the notch in the shaped piece. The counterpart surfaces include a recess assembly for the expansion assembly.

10 Claims, 4 Drawing Sheets

(56) References Cited

U.S. PATENT DOCUMENTS

| | | |
|---|---|---|
| 6,241,080 B1 | 6/2001 | Tuomikoski |
| 2013/0288837 A1* | 10/2013 | Tuomikoski ............ F16G 13/07 474/148 |

FOREIGN PATENT DOCUMENTS

| | | |
|---|---|---|
| FI | 101098 B | 4/1998 |
| JP | 2012232851 A | 11/2012 |
| SE | 458056 B | 9/1983 |
| WO | WO-2012/085328 A1 | 6/2012 |

OTHER PUBLICATIONS

PCT/ISA/210—International Search Report—dated Jun. 1, 2015 (Issued in Application No. PCT/FI2015/050015).

* cited by examiner

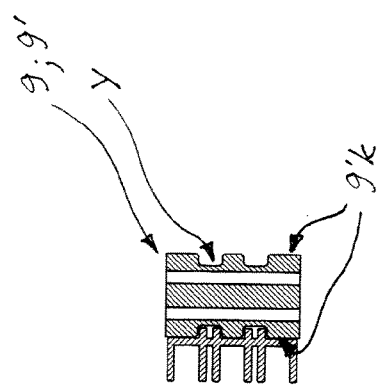
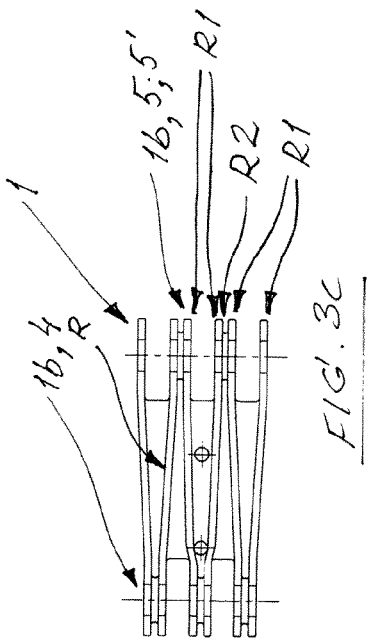
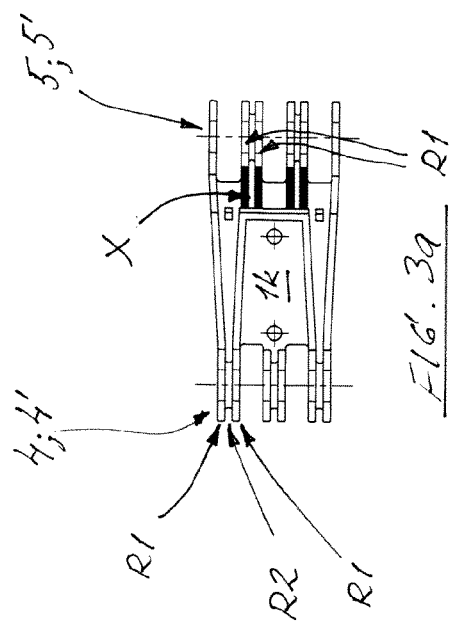
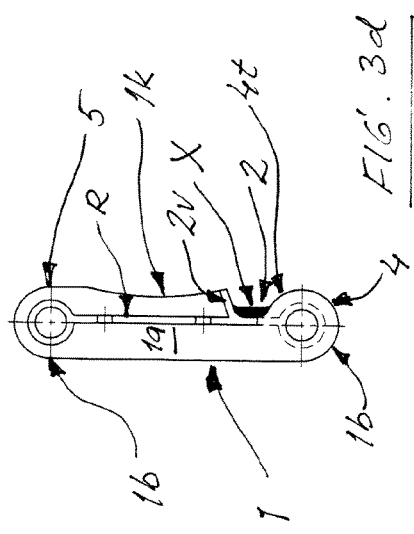

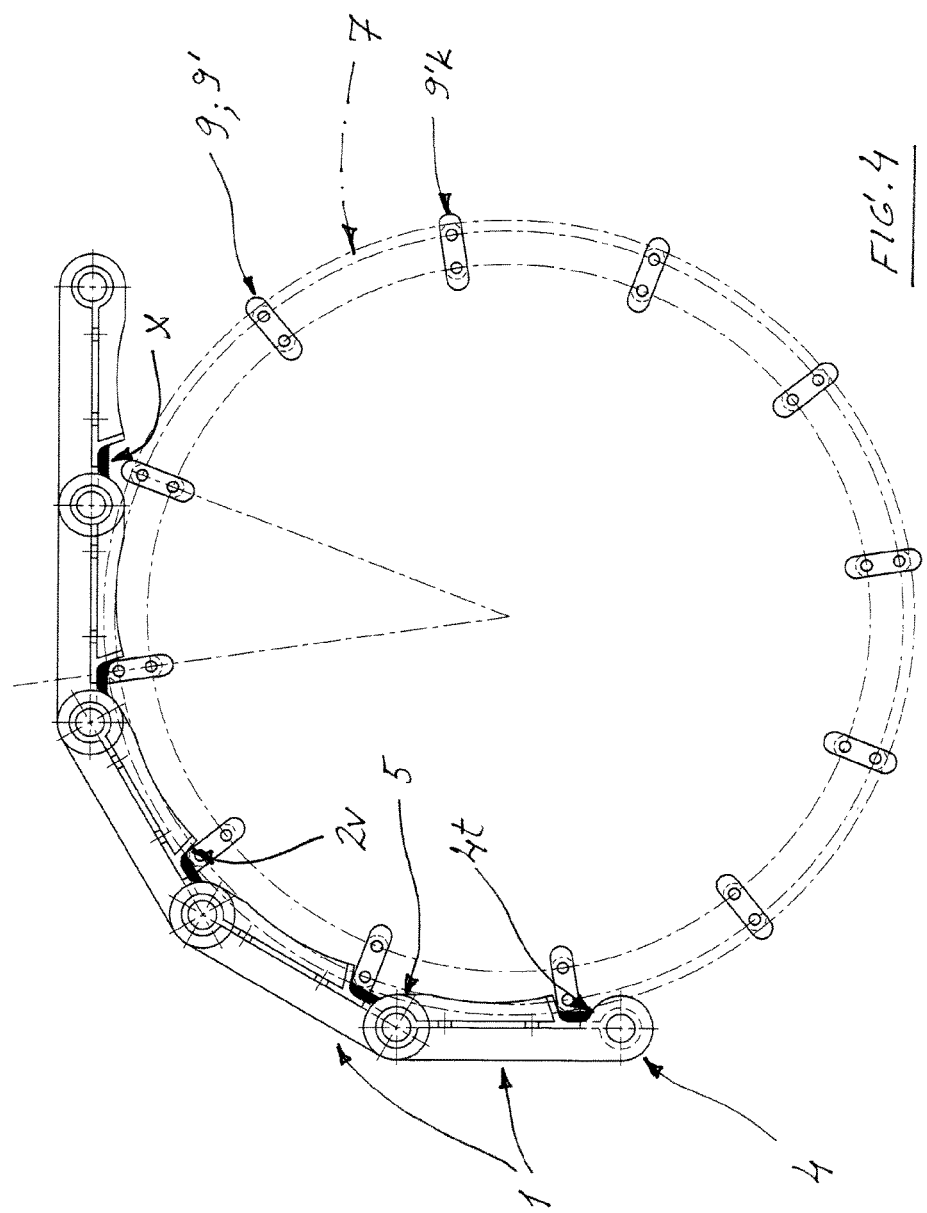

APPARATUS FOR USE OF CHAIN

CROSS-REFERENCE TO RELATED APPLICATIONS

The application claims priority to Finnish patent application 20145146 filed 14 Feb. 2014 and is the national phase under 35 U.S.C. § 371 of PCT/FI2015/050015 filed 15 Jan. 2015.

FIELD OF THE INVENTION

The invention relates an apparatus for use of chain.

BACKGROUND OF THE INVENTION

Regarding a traditional chain structure power transmission for using a chain is usually transmitted by a drive wheel, the shape of the teeth of which is standardized. A more developed chain structure in this respect is previously known e.g. from Finnish patents FI 64707 and FI 101098. The chains presented in these patents consist of shaped pieces to be coupled with each other one after the other by jointing points thereof, whereby the supporting surfaces of the shaped pieces comprise notches existing crosswise in respect to the moving direction to the chain, the notch in each shaped piece being placed advantageously near one of the jointing points of the shaped piece. In this case, when the chain gets bent over the drive wheel, an advantageous lever arm is achieved, thanks to which the chain force influencing the chain structure presses the notches of the chain harder against the pins of the drive wheel. This solution decreases significantly so called skipping. Also thanks to the level arms being formed, the chain structure gets easily loose from the drive wheel on its return side, thanks to which a so called non-engagement of the chain is prevented.

The chain structure according to Patent FI 64707 has proved to be significantly better than corresponding earlier solutions, particularly thanks to the lever arms being achieved therewith. In certain purposes, such as in chain structures, being used in water refineries, plastics or corresponding non-metallic materials have been exploited, because e.g. of corrosion and in order to decrease the specific gravity of the chain. In this case, in certain environments, such as e.g. in acid conditions, problems have arisen related to duration of the plastic material of the shaped pieces.

On the other hand, in patent FI 101098 there has been presented an improvement for the part of the bending of a chain particularly along the longitudinal direction of the joint pins, which is minimized by using joint pins, being uniform in the longitudinal direction thereof and the cross section of which increases towards one end thereof. When exploiting furthermore advantageously e.g. joint pins, that are continuously conical, the surface pressures may be optimized under all circumstances in a way, that the type of bending of the chain may be even totally eliminated in principle. In addition to that, by exploiting the type of joint pins even mounting of the chain may be eased by the guiding effect of the conical joint pin.

Improving the tensile strength and the bending stiffness of the shaped pieces have been tried usually by increasing material thickness of the shaped pieces at the point of the notch on the opposite side with respect to the supporting surface, which can not be carried out optimally under all circumstances from the point of view of functionality of the use of chain. This is first of all due to the fact that increasing the distance of the back part of the shaped piece from a center line defined by the joint pins of a chain brings about problems particularly in the guiding of the passage of the chain as well as in the controlling of its passage i.e. in the functioning of e.g. so called chain guides. On the other hand, it is more profitable to arrange the depth of a notch in a shaped piece to extend in the shaped piece essentially at the center line of the chain, which enables an optimal power transmission between the drive wheel driving the chain and the shaped pieces of the chain. In this way it is made possible carrying out of the chain in an optimized manner both structurally and regarding its functioning without extra swing and vibration. With chains that are put together with shaped pieces, being in use at present, the problems described above can not be satisfactorily solved.

SUMMARY OF THE INVENTION

It is an aim of the apparatus according to the present invention to achieve a decisive improvement in the problems presented above and thus to raise substantially the level of knowledge in the field.

As the most important advantages of the apparatus according to the invention may be mentioned simplicity and reliability of the use and construction of the chain enabled by the same, whereby the physical properties of the shaped pieces forming the chain and functioning of the chain formed of the same can be optimized by minimizing at the same time also the material consumption in manufacturing thereof. By virtue of the expansion assembly placed at the notch, the invention makes thus possible a strengthening structure of the shaped piece deviating from traditional constructions by optimizing the material consumption of the shaped piece in relation to its physical properties. The invention also makes possible placement of the notch in a shaped piece essentially at the center line of the chain without a need for increasing the distance of the back surface of the shaped piece with respect to the back surface of the "notchless" part of the shaped piece. In this case also thanks to the chain vibration being prevented, it is possible to increase remarkably the lifetime of a whole chain drive apparatus. When utilizing advantageously furthermore shaped pieces with arched support surfaces, the contact surface of mutual supporting surfaces of successive formed pieces forming the chain and a turning wheel or a drive wheel can be efficiently expanded in a way that the jointing points do not cause momentum that brings about vibration. In the apparatus according to the invention it is naturally possible furthermore to utilize advantageously e.g. continuously conical joint pins according to the patent FI 101098 being cited earlier, which for their part furthermore simultaneously minimize the bending of the chain.

BRIEF DESCRIPTION OF THE DRAWINGS

In the following description, the invention is illustrated in detail with reference to the appended drawings, wherein
in FIGS. 1a-1c
is shown as a side view, as a view from above and as a front view as seen from the end of the shaped piece's fork assembly an advantageous shaped piece of a chain belonging to an apparatus according to the invention,
in FIGS. 2a and 2b
is presented power transmission with a traditional chain (FIG. 2a) and the same with a shaped piece of an advantageous chain (FIG. 2b) belonging to an apparatus according to the invention, in FIGS. 3a-3d is shown an advantageous shaped piece of a chain belonging to an apparatus according to the invention as a view from above as seen from the side of the shaped piece with the support surface, co-operation of a shaped piece and a drive piece of the drive arrangement as a front view as seen from the end of the shaped piece's fork assembly, as a view as seen from the shaped piece's backside and as a side view of the shaped piece, in FIG. 4 is shown bending over a chain wheel of the shaped pieces forming a chain belonging to an apparatus according to the invention.

DETAILED DESCRIPTION OF EMBODIMENTS OF THE INVENTION

Figure 1C:
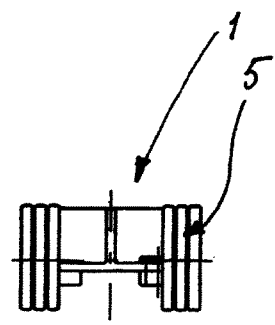
Figure 1A:
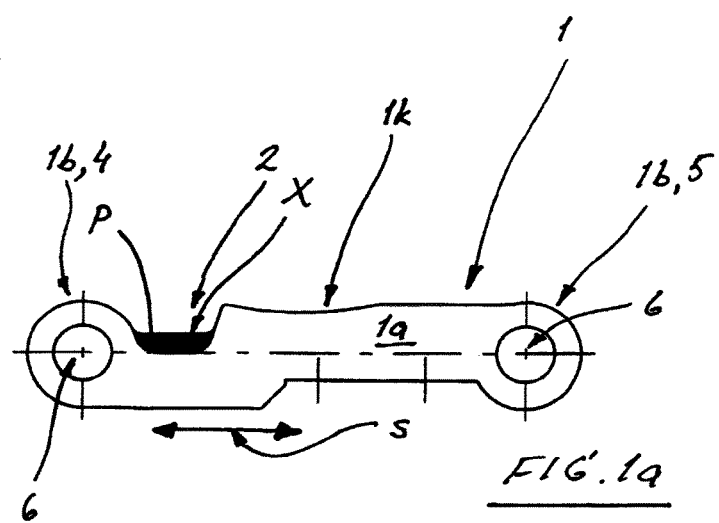

The invention relates to an apparatus for use of chain, comprising a chain, such as a transmission chain, conveyor chain and/or like, which is formed of: shaped pieces 1, to be connected to each other one after the other at jointing points 4, 5 in jointing parts 1b, existing at opposite ends of the shaped pieces, by means of joint pins, whereby a first jointing point of the jointing parts 1b is arranged as a uniform projection assembly 4 that is essentially narrower than the width L of a center part 1a of the shaped piece, and a second jointing point as a fork assembly 5, whereby each of the jointing points 4, 5 has a hole 6 in order to form a uniform chain by placing the said projection assembly 4 of a previous shaped piece between the fork assembly 5 of a following shaped piece and by placing a joint pin in the hole 6; and a drive arrangement, which includes at least one chain wheel 7, such as a drive wheel, a turning wheel or like. A supporting surface 1k existing in the center part 1a of the shaped piece 1 belonging to the chain comprises a notch 2 that is arranged essentially crosswise in respect to the moving direction of the chain and that is during conveying of the chain in cooperation with counterpart surfaces 9, belonging to the chain wheel 7 and being arranged according to the notches 2a of the chain and essentially crosswise in respect to the moving direction of the chain. A shaped piece belonging to the chain is arranged strengthened on the principle as shown e.g. in FIGS. 1a, 1b, 3a and 3d by an expansion assembly X protruding from a bottom P of the notch 2 and continuing uniformly in the longitudinal direction s of the shaped piece 1 at the point of the notch 2.

As an advantageous embodiment of the apparatus according to the invention, the counterpart surfaces of the drive arrangement are arranged by drive pieces 9' fastened to the chain wheel 7, the pieces having particularly with reference to the advantageous embodiment shown in FIG. 3b a counterpart surface 9'k that settles against the bottom P of the notch 2 in the shaped piece, said counterpart surface being provided with a recess assembly Y for the expansion assembly X. By virtue of the expansion assembly X according to the invention and the recess assembly Y in the drive piece 9' also the guiding of the passage of the chain can be made more efficient thanks to keeping the line of the chain constant in a crosswise direction by the assemblies mentioned above, in which case it is also easier to avoid a result caused by overload e.g. as shown in FIG. 2a that is typical for traditional chains.

As a furthermore advantageous embodiment of the apparatus according to the invention, the notch 2 in the shaped piece 1 belonging to the chain is arranged according to the appended drawings in connection with the first jointing point 4 of the shaped piece. In this case with reference to FIGS. 3d and 4, a trailing edge of the notch 2 in the shaped piece 1 is formed of the back edge 4t of the first jointing point 4, whereby the driving edge of the notch 2 ends up on the supporting surface 1k at a reinforced edge 2a or like existing thereon e.g. as shown in FIG. 3d.

Furthermore, as an advantageous embodiment of the apparatus according to the invention, the first and the second jointing points 4, 5 in the shaped piece 1 are arranged e.g. with reference to FIGS. 1b, 1c, 3a and 3c as lightened structures by two or more parallel ribbed rings R1, being connected with each other by an intermediate part R2 with a smaller diameter.

Figure 1B:
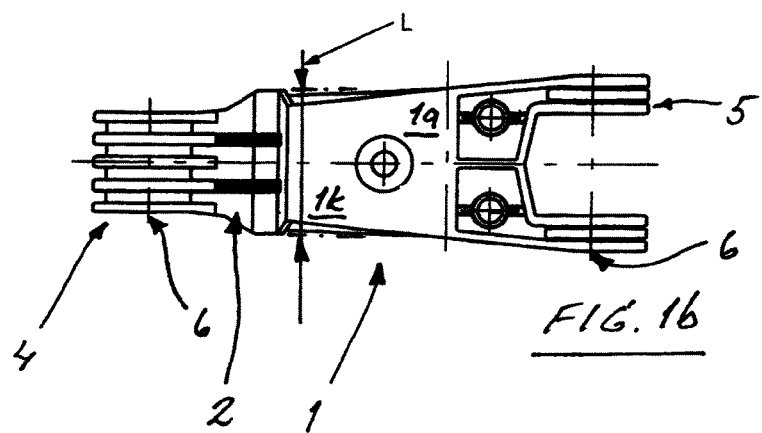

Particularly with reference to the further advantageous embodiments shown in FIGS. 1b and 3a, the expansion assembly X on the bottom P of the notch 2 in the shaped piece is formed of two or more parallel ribbed projections, which are carried out by extensions of the ribbed rings R1. Particularly in the embodiment being presented in FIGS. 3a-3d also the center part 1a of the shaped piece has a ribbed structure R.

Furthermore, as an advantageous embodiment, the counterpart surfaces 9 of the drive arrangement are arranged particularly with reference to the advantageous embodiments shown in FIGS. 3b and 4 by an elongated drive piece 9', having corresponding contact surfaces 9'k, Y at its opposite ends in order to enable double-ended use thereof.

Furthermore, as an advantageous embodiment of the apparatus according to the invention, the shaped pieces 1 of the chain are manufactured from composite material, such as reinforced plastic, ceramic material and/or the like. In reinforced plastic as the fiber material instead of glass fiber or in addition thereto, e.g. carbon fiber, aramid fiber and/or natural fibers can be used. The strength of the components belonging to the apparatus can thus be adjusted by controlling the orientation of the fibers in manufacturing of the composite material. As the binding agent e.g. polyester resin or epoxy resin can be used. It is also possible to manufacture the shaped pieces from metal light alloy or to utilize metal and/or rock etc, in the composite material.

Depending on the operating target of the apparatus according to the invention, different components belonging thereto can be manufactured from mutually differing manufacturing materials, such as joint pins from carbon fiber and the shaped pieces from glass fiber etc.

Depending on the operating purpose and circumstances of the apparatus to be produced at any given time, as plastic to be used in the manufacturing of the components belonging thereto can be used thermoplastic, such as commodity plastic (PE, PP), engineering plastic (PET, PMMA, PC, PA, POM, ABS+PC), speciality plastic (PTFE) or thermoset plastic (PTR, UP, EP, VE, PF, MF/AF) etc.

Figure 2B:
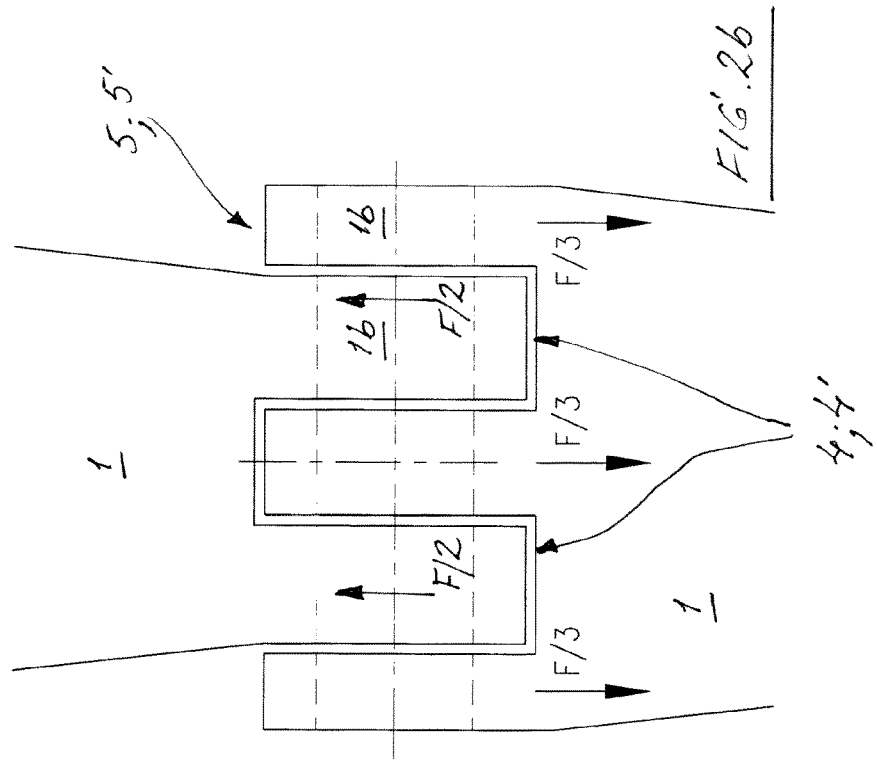
Figure 2A:
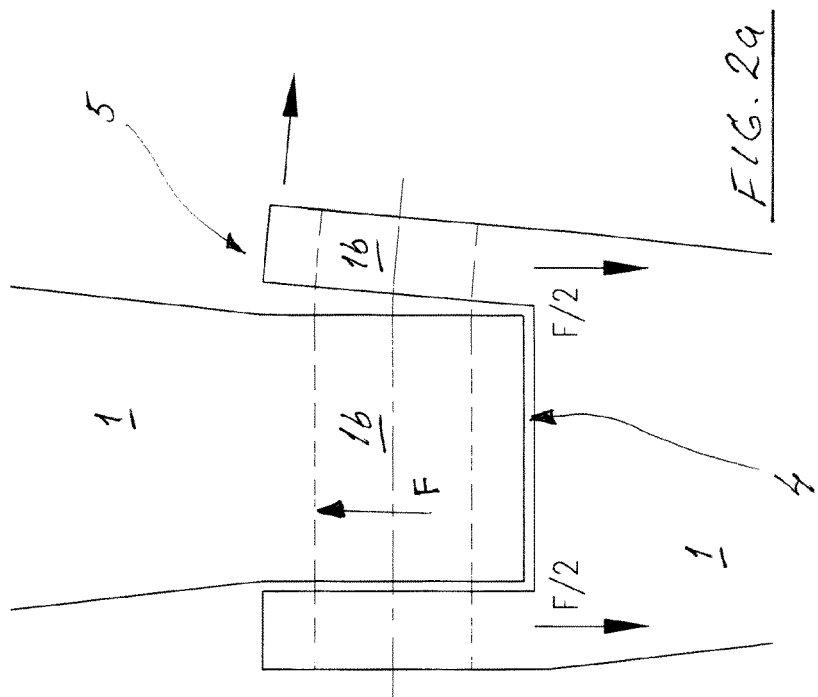

Furthermore, as an advantageous embodiment particularly to bring about the principle shown in FIG. 2b, the projection assembly 4 of the first jointing point in the shaped piece 1 is arranged e.g. by two or more, like shown in FIGS. 3a-3d with three parallel projection parts 4'. In this case respectively the fork assembly 5 of the second jointing point in the shaped piece 1 is arranged by two or more, like shown in FIGS. 3a-3d with three parallel fork parts 5'. With the structures described above bending of a joint pin and distortion of the fork part of a shaped piece in a chain, which may occur with present chain structures, can be avoided thanks to the chain being able to bend on the principle shown in FIG. 2a and thus avoiding from breaking of the shaped piece.

It is clear that the invention is not limited to the embodiments presented or described above, but instead it can be modified even to a great extent depending on the operating targets at any given time. It is thus first of all clear that the components being utilized in the invention can be manufactured from most heterogeneous materials, by utilizing most heterogeneous manufacturing techniques. On the other hand also the drive notches in the shaped pieces can be placed in a deviating manner in respect with what has been presented above e.g. in connection with a, so to say, driving jointing part of the shaped piece or in a more centralized manner on the middle part of the supporting surface of the shaped piece. In the invention it is also possible to utilize e.g. a circular drive pin being provided with a recess assembly. In the invention, it is also possible and advantageous to exploit a conical joint pin known as such in the jointing parts of the successive shaped pieces, in which context it might be possible also to use in the successive jointing points of the shaped pieces joint pins that expand in opposite directions. It is also possible to manufacture the joint pins e.g. from suitable materials in a way that in the joint pins there are ready made projection arrangements that enable some kind of a snap locking etc.

The invention claimed is:

1. An apparatus for use of chain, comprising a chain, which is formed of: shaped pieces, to be connected to each other one after the other at jointing points in jointing parts, existing at opposite ends of the shaped pieces, utilizing joint pins, whereby a first jointing point of the jointing parts is arranged as a uniform projection assembly that is essentially narrower than the width of a center part of the shaped piece, and a second jointing point as a fork assembly, whereby each of the jointing points has a hole in order to form a uniform chain by placing the projection assembly of a previous shaped piece between the fork assembly of a following shaped piece and by placing a joint pin in the hole; and a drive arrangement, which includes at least one chain wheel, whereby a supporting surface existing in the center part of the shaped piece belonging to the chain comprises a notch that is arranged essentially crosswise in respect to the moving direction of the chain and that is during conveying of the chain in cooperation with counterpart surfaces, belonging to the chain wheel and being arranged according to the notches of the chain and essentially crosswise in respect to the moving direction of the chain, wherein a shaped piece of the chain is arranged strengthened by an expansion assembly protruding from a bottom of the notch and continuing uniformly in the longitudinal direction of the shaped piece at the point of the notch, and wherein the chain wheel comprises counterpart surfaces that settle against the bottom of the notch in the shaped piece, said counterpart surfaces extends into a recess of the expansion assembly.

2. The apparatus according to claim 1, wherein the counterpart surfaces of the drive arrangement are arranged by drive pieces fastened to the chain wheel, the pieces having a counterpart surface comprise the recess assembly.

3. The apparatus according to claim 1, wherein the notch in the shaped piece of the chain is arranged in connection with the first jointing point of the shaped piece.

4. The apparatus according to claim 3, wherein a trailing edge of the notch in the shaped piece is formed of the back edge of the first jointing point, whereby the driving edge of the notch ends up on the supporting surface.

5. The apparatus according to claim 1, wherein the first and the second jointing points in the shaped piece are arranged as lightened structures by two or more parallel ribbed rings, being connected with each other by an intermediate part with a smaller diameter.

6. The apparatus according to claim 1, wherein the expansion assembly on the bottom of the notch in the shaped piece is formed of two or more parallel ribbed projections.

7. The apparatus according to claim 1, wherein the counterpart surfaces of the drive arrangement are arranged by an elongated drive piece, having corresponding contact surfaces at its opposite ends in order to enable double-ended use thereof.

8. The apparatus according to claim 1, wherein the shaped pieces of the chain are manufactured from composite material.

9. The apparatus according to claim 1, wherein the projection assembly of the first jointing point in the shaped piece is arranged by two or more parallel projection parts.

10. The apparatus according to claim 1, wherein the fork assembly of the second jointing point in the shaped piece is arranged by two or more parallel fork parts.

* * * * *